US011866980B2

(12) United States Patent
Im et al.

(10) Patent No.: US 11,866,980 B2
(45) Date of Patent: *Jan. 9, 2024

(54) REFRIGERATOR

(71) Applicant: LG Electronics Inc., Seoul (KR)

(72) Inventors: Jihyun Im, Seoul (KR); Dongjeong Kim, Seoul (KR); Heejun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 43 days.

This patent is subject to a terminal disclaimer.

(21) Appl. No.: 17/575,324

(22) Filed: Jan. 13, 2022

(65) Prior Publication Data

US 2022/0136307 A1 May 5, 2022

Related U.S. Application Data

(63) Continuation of application No. 16/207,984, filed on Dec. 3, 2018, now Pat. No. 11,255,118.

(30) Foreign Application Priority Data

Dec. 1, 2017 (KR) ........................ 10-2017-0164486

(51) Int. Cl.

*E05F 15/00* (2015.01)
*E05F 15/619* (2015.01)
*F25D 23/02* (2006.01)

(52) U.S. Cl.

CPC .......... *E05F 15/619* (2015.01); *F25D 23/028* (2013.01); *E05Y 2201/10* (2013.01);

(Continued)

(58) Field of Classification Search

CPC ....... E05F 23/067; E05F 15/02; E05F 15/619; E05F 25/025; E05F 23/021; F25D 23/028;

(Continued)

(56) References Cited

U.S. PATENT DOCUMENTS 6,030,064 A * 2/2000 Kim ...................... E05D 7/0423 312/405
8,469,469 B2 6/2013 Kim et al.

(Continued)

FOREIGN PATENT DOCUMENTS

JP 2001055863 2/2001
KR 20110022849 3/2011

(Continued)

OTHER PUBLICATIONS

Office Action in Korean Appln. No. 10-2017-0164486, dated Apr. 28, 2022, 8 pages (with English translation).

*Primary Examiner* — Chi Q Nguyen
(74) *Attorney, Agent, or Firm* — Fish & Richardson P.C.

(57) ABSTRACT

A refrigerator includes a cabinet including an outer case forming an external appearance and a storage compartment, a refrigerator door coupled to the cabinet to open or close the storage compartment, an installation bracket coupled to the outer case inside the outer case, a door opening device installed in the installation bracket outside the outer case and including a push member for opening or closing the refrigerator door, and a buffer member disposed a coupling portion between the door opening device and the installation bracket.

20 Claims, 8 Drawing Sheets

(52) U.S. Cl.
CPC ... *E05Y 2201/434* (2013.01); *E05Y 2201/716* (2013.01); *E05Y 2201/722* (2013.01); *E05Y 2600/51* (2013.01); *E05Y 2600/56* (2013.01); *E05Y 2600/636* (2013.01); *E05Y 2800/266* (2013.01); *E05Y 2900/31* (2013.01); *F25D 2323/02* (2013.01); *F25D 2400/40* (2013.01)

(58) Field of Classification Search
CPC ............. F25D 2323/02; F25D 2400/40; E05Y 2600/56; E05Y 2800/266; E05Y 2201/10; E05Y 2900/31; E05Y 2600/636; E05Y 2201/434; E05Y 2201/716; E05Y 2600/51; E05Y 2201/722; A47B 88/483; A47B 88/43
USPC ........................... 49/340, 341, 342, 324, 381
See application file for complete search history.

(56) References Cited

U.S. PATENT DOCUMENTS

| | | | | |
|---|---|---|---|---|
| 9,074,809 | B2 * | 7/2015 | Lee | E05D 7/0423 |
| 9,631,857 | B2 | 4/2017 | Yoon et al. | |
| 10,202,792 | B2 | 2/2019 | Kim et al. | |
| 10,619,395 | B2 | 4/2020 | Kim et al. | |
| 10,724,782 | B2 * | 7/2020 | Lee | F25D 23/028 |
| 2010/0033067 | A1 * | 2/2010 | Kim | E05D 7/12 16/221 |
| 2011/0048060 | A1 | 3/2011 | Kim et al. | |
| 2011/0083461 | A1 | 4/2011 | Kim | |
| 2015/0308158 | A1 * | 10/2015 | Jeon | E05B 65/0042 312/405 |
| 2016/0245579 | A1 | 8/2016 | Eom et al. | |
| 2016/0312516 | A1 | 10/2016 | Heydel et al. | |
| 2017/0261252 | A1 | 9/2017 | Son et al. | |
| 2017/0292777 | A1 | 10/2017 | Lee | |
| 2017/0336132 | A1 | 11/2017 | Chang et al. | |
| 2018/0038634 | A1 * | 2/2018 | Kim | E05F 15/619 |
| 2018/0187955 | A1 * | 7/2018 | Son | F25D 23/028 |
| 2018/0223582 | A1 | 8/2018 | Shin et al. | |
| 2019/0292831 | A1 | 9/2019 | Choi | |
| 2019/0323763 | A1 | 10/2019 | Kang | |

FOREIGN PATENT DOCUMENTS

| | | |
|---|---|---|
| KR | 101745124 | 6/2017 |
| KR | 20170094548 | 8/2017 |

* cited by examiner

REFRIGERATOR

CROSS-REFERENCE TO RELATED APPLICATIONS

This application is a continuation of U.S. application Ser. No. 16/207,984, filed on Dec. 3, 2018, now U.S. Pat. No. 11,255,158, which claims the benefit of the Korean Patent Application No. 10-2017-0164486, filed on Dec. 1, 2017. The disclosures of the prior applications are incorporated by reference in their entirety.

BACKGROUND

The present disclosure relates to a refrigerator.

A refrigerator is a home appliance that can keep objects such as food in a storage compartment provided in a cabinet at a low temperature. The storage compartment may be surrounded by an insulation wall such that the internal temperature of the storage compartment is maintained at a temperature lower than an external temperature.

The storage compartment may be referred to as a refrigerating compartment or a freezing compartment according to the temperature range of the storage compartment.

A user may open and close the storage compartment using a door. The user opens the door in order to put objects into the storage compartment or take objects out of the storage compartment. In some examples, the door is rotatably provided on the cabinet and a gasket is provided between the door and the cabinet.

In some cases, in a state of closing the door, the gasket is closely adhered between the door and the cabinet to prevent leakage of cool air from the storage compartment. As adhesion force of the gasket increases, the effect of preventing leakage of cool air may increase.

In order to increase adhesion force of the gasket, the gasket may be formed of, for example, a rubber magnet or a magnet may be provided in the gasket. However, if adhesion force of the gasket increases, a large force may be required to open the door.

Recently, refrigerators having an auto closing function have been provided. For example, an auto closing function refers to a function for automatically closing the door of the refrigerator using adhesion force and magnetic force of the gasket and elastic force of a spring when the door of the refrigerator is slightly opened.

In some examples, the auto closing function refers to a function for preventing the door of the refrigerator from being automatically opened even when the refrigerator is slightly tilted forward.

In some cases, the refrigerators may require a large force to open a door because a user may pull the door with force larger than adhesion force and magnetic force of a gasket and elastic force of a spring.

Recently, a door opening device for automatically opening a door has been proposed.

Prior Art Reference 1

A refrigerator including a door opening device for automatically opening a door of the refrigerator has been disclosed in Korean Patent Registration No. 1745124.

In the prior art reference 1, the door opening device is disposed on an upper side of the door of the refrigerator.

The door opening device includes a push rod, moving from an initial position to a door opening position, and a motor for providing power to the push rod.

The push rod is unloaded from the inside of the door to the outside for opening the door of the refrigerator and pushes a cabinet to open the door.

However, in the prior art reference 1, since the door opening device is included in the door of the refrigerator, a length of the push rod is limited within a thickness range of the door of the refrigerator, and due to this, there is difficult to increase an opening angle of the door of the refrigerator.

Prior Art Reference 2

A door opening unit of a refrigerator has been disclosed in Japanese patent laid-open publication No. 2001-55863.

The door opening unit of the prior art reference 2 is installed in a ceiling part of a refrigerator body. The door opening unit includes a lower case, and the lower case is equipped so as to be buried in a portion of the ceiling part.

For example, the lower case is fastened to the ceiling part by a screw with the lower case being buried in the ceiling part.

However, in the prior art reference 2, the lower case which is directly fastened to the ceiling part with the lower case being buried in the ceiling part contacts a heat insulator, but in a case where the lower case is fastened before forming the heat insulator, the lower case is deformed in a process of cooling a foaming agent filled into the refrigerator body.

On the other hand, in a case where the foaming agent is filled into the refrigerator body before the lower case is fastened, an opening into which the lower case is inserted is covered by a separate cover, and thus, a leakage of the foaming agent is prevented. Also, the cover should be separated after foaming is completed, and the lower case should be fastened to the ceiling part. For this reason, work is complicated.

Moreover, since the lower case is directly fastened to the ceiling part of the refrigerator body, vibration occurring when the door opening unit operates is directly transferred to the lower case.

SUMMARY

The present embodiment provides a refrigerator in which an opening angle of a refrigerator door increases.

The present embodiment provides a refrigerator in which a door opening device is installed in a cabinet without changing a mold for forming the cabinet.

The present embodiment provides a refrigerator for preventing the damage of a part to which a buffer member for preventing a vibration of the door opening device from being transferred to a cabinet is coupled.

A refrigerator includes: a cabinet including an outer case forming an external appearance and a storage compartment; a refrigerator door coupled to the cabinet to open or close the storage compartment; an installation bracket coupled to the outer case inside the outer case; a door opening device installed in the installation bracket outside the outer case, the door opening device including a push member for opening or closing the refrigerator door; and a buffer member disposed a coupling portion between the door opening device and the installation bracket.

The installation bracket may include an installation part having a recessed shape, and the door opening device may include a coupling part coupled to the installation part, the buffer member being coupled to the door opening device.

The installation part may include a bottom surface and a perimeter surface, a coupling projection to which the buffer member is coupled may be provided on the bottom surface, and a portion of the coupling projection may be coupled to the perimeter surface.

The coupling projection may be provided as one body with the bottom surface and the perimeter surface.

One side of the buffer member may be opened in order for the buffer member to be coupled to the coupling projection.

When seen from an upper side, the buffer member may be provided in a U-shape.

The coupling part may include a space part, where the buffer member is disposed, and a fixing part protruding to the space part, and a slot into which the fixing part is accommodated may be provided on a perimeter of an outer circumference surface of the buffer member.

An inner circumference surface of the buffer member may form a space into which the coupling projection is accommodated.

A coupling hook may be provided in the fixing part, and a hook insertion part, which is recessed in a direction from the slot to the inner circumference surface of the buffer member and into which the coupling hook is inserted, may be provided in the buffer member.

A pair of coupling hooks may be disposed to face each other in the fixing part.

The coupling part may pass through an opening of the outer case and may be accommodated into the installation part.

The door opening device may further include a driving motor driving the push member, and the installation bracket may further include a motor accommodation part accommodating the driving motor.

An opening through which the driving motor passes may be provided in the outer case.

The push member may be provided in a curved shape, the push member may include a first end, contacting the refrigerator door in a process of opening the refrigerator door, and a second end disposed on an opposite side of the first end, and a length from the first end to the second end may be set greater than a thickness of the refrigerator door.

The push member may move from an initial position to a door opening position, for opening the refrigerator door. With the push member being disposed at the initial position, the first end may be disposed closer to the refrigerator door than the second end. The second end may be disposed closer to a sidewall of the outer case than the first end.

The installation bracket may further include a cable guide guiding a cable connected to the refrigerator door. An opening through which the cable guide passes may be provided in the outer case.

The push member may include an inner circumference disposed close to a hinge shaft of the refrigerator door and an outer circumference surface disposed on an opposite side of the inner circumference, and the cable guide may be disposed between the inner circumference and the hinge shaft.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
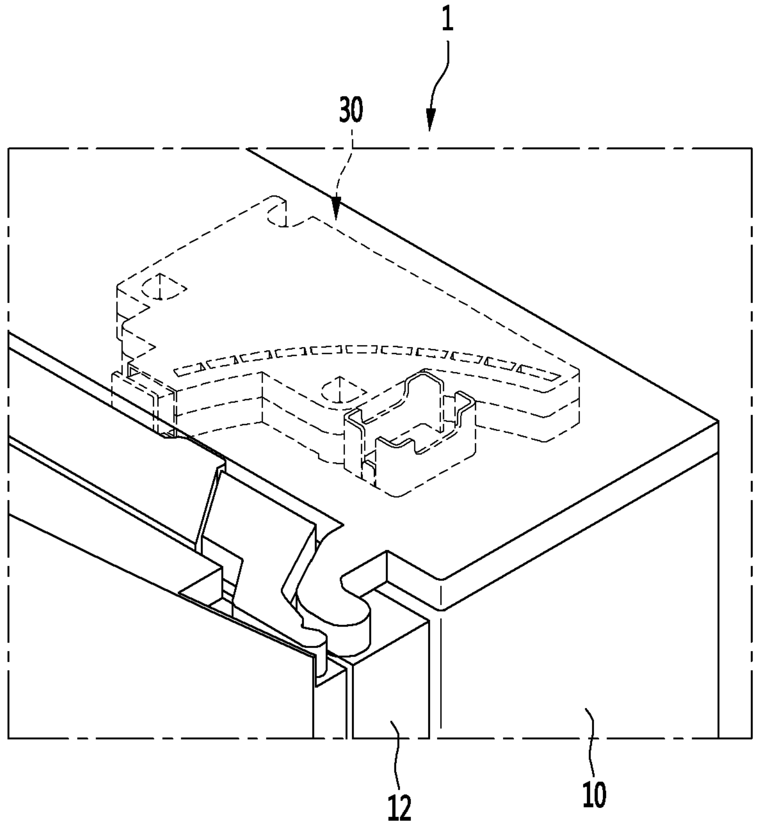
FIG. 1 is a perspective view illustrating an example where a door opening device according to an embodiment of the present invention is installed on an upper side of the cabinet.
Figure 2:
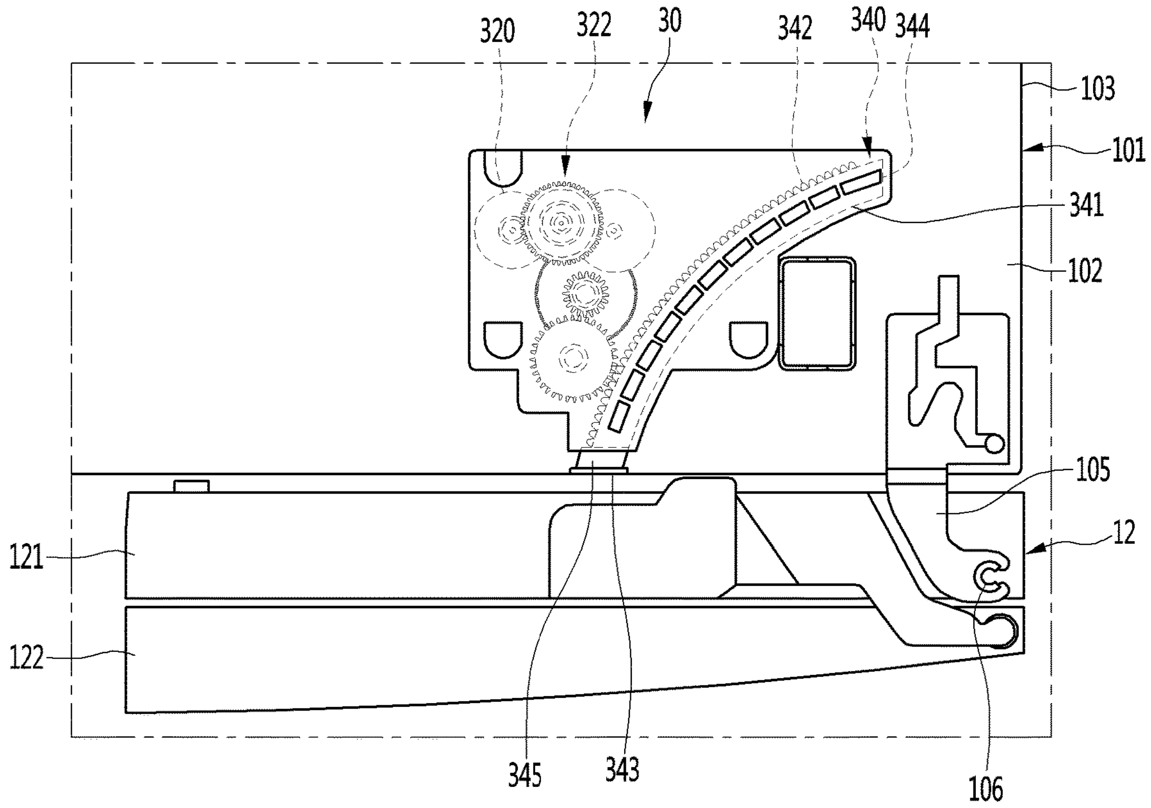
FIG. 2 is a plan view illustrating an example where a door opening device according to an embodiment of the present invention is installed on an upper side of the cabinet.

FIG. 1 is a perspective view illustrating an example where a door opening device according to an embodiment of the present invention is installed on an upper side of the cabinet, and FIG. 2 is a plan view illustrating an example where a door opening device according to an embodiment of the present invention is installed on an upper side of the cabinet.

Referring to FIGS. 1 and 2, a refrigerator 1 according to an embodiment of the present invention may include a cabinet 10 including a storage compartment and a refrigerator door 12 which is rotatably coupled to the cabinet 10 to open or close the storage compartment.

The storage compartment may include one or more of a freezer compartment and a cooling compartment. The refrigerator door 12 may be configured with a single door or a plurality of doors.

If the refrigerator door 12 includes the plurality of doors, the refrigerator 12 may include an outer door 122 and an inner door 121.

The refrigerator door 12 may be rotatably coupled to the cabinet 10 by a hinge mechanism 105.

The refrigerator 1 may further include a door opening device 30 installed in the cabinet 10.

The door opening device 30 may be an element for automatically opening the refrigerator door 12.

The cabinet 10 may include an outer case 101. Although not shown, the cabinet 10 may further include an inner case which configures the storage compartment, and a heat insulator may be provided between the inner case and the outer case 101.

The door opening device 30 may be disposed on, for example, an upper sidewall of the outer case 101.

The door opening device 30 may include a push member 340 which pushes the refrigerator door 12 for opening the refrigerator door 12.

In FIG. 2, a position of the push member 340 may be referred to as an initial position. Also, in the present specification, a position of the push member 340 when opening of the refrigerator door 12 is completed by the push member 340 may be referred to as a door opening position (a position of the push member of FIG. 8).

The push member 340 may include a push rod 341 having a curved shape so as to increase an opening angle of the refrigerator door 12.

The door opening device 30 may include a driving motor 320 for driving the push member 340 and a power transfer unit 322 for transferring a dynamic force of the driving motor 320 to the push member 340.

Although not limited, the power transfer unit 322 may include a plurality of gears.

The push rod 341 may include a rack gear 342 for receiving the dynamic force of the driving motor 320. The rack gear 342 may be engaged with one of the plurality of gears.

The push rod 341 may be provided in, for example, an arc shape with respect to a hinge shaft 106 of the hinge mechanism 105.

The push rod 341 may include an inner circumference surface and an outer circumference surface having a radius which is greater than that of the inner circumference surface. The rack gear 342 may be provided on the outer circumference surface.

The inner circumference surface may be disposed closer to the hinge shaft 106 of the refrigerator door 12 than the outer circumference surface.

The push member 340 may include a first end 343, which contacts the refrigerator door 12 in a process of opening the refrigerator door 12, and a second end 344 disposed on the opposite side of the first end 343.

In this case, the first end 343 may directly contact the refrigerator door 12, or a cover part 345 including a rubber material may be coupled to the push rod 341, whereby the cover part 345 may contact the refrigerator door 12.

In FIG. 2, an example where the cover part 345 is coupled to the push rod 341 is illustrated. If the cover part 345 is coupled to the push rod 341, the first end 343 of the push member 340 may be a front portion of the cover part 345, and the second end 344 may be an end of the push rod 341.

Although not limited, a length from the first end 343 to the second end 344 may be set greater than a thickness of the refrigerator door 12.

Therefore, according to the present embodiment, since the thickness of the push member 340 is set greater than the thickness of the refrigerator door 12, an opening angle of the refrigerator door 12 may increase.

Moreover, even when the push member is provided in a curved shape, a horizontal distance of the first end 343 and the second end 344 in a forward/rearward direction of the refrigerator 1 may be set greater than the thickness of the refrigerator door 12.

In a state where the push member 340 is located at an initial position, the first end 343 may be disposed to face the refrigerator door 12.

Moreover, in a state where the push member 340 is located at the initial position, the first end 343 may be disposed closer to the refrigerator door 12 than the second end 344.

Moreover, in a state where the push member 340 is located at the initial position, the second end 344 may be disposed closer to a sidewall 103 of the outer case 101 than the first end 343.

Figure 3:
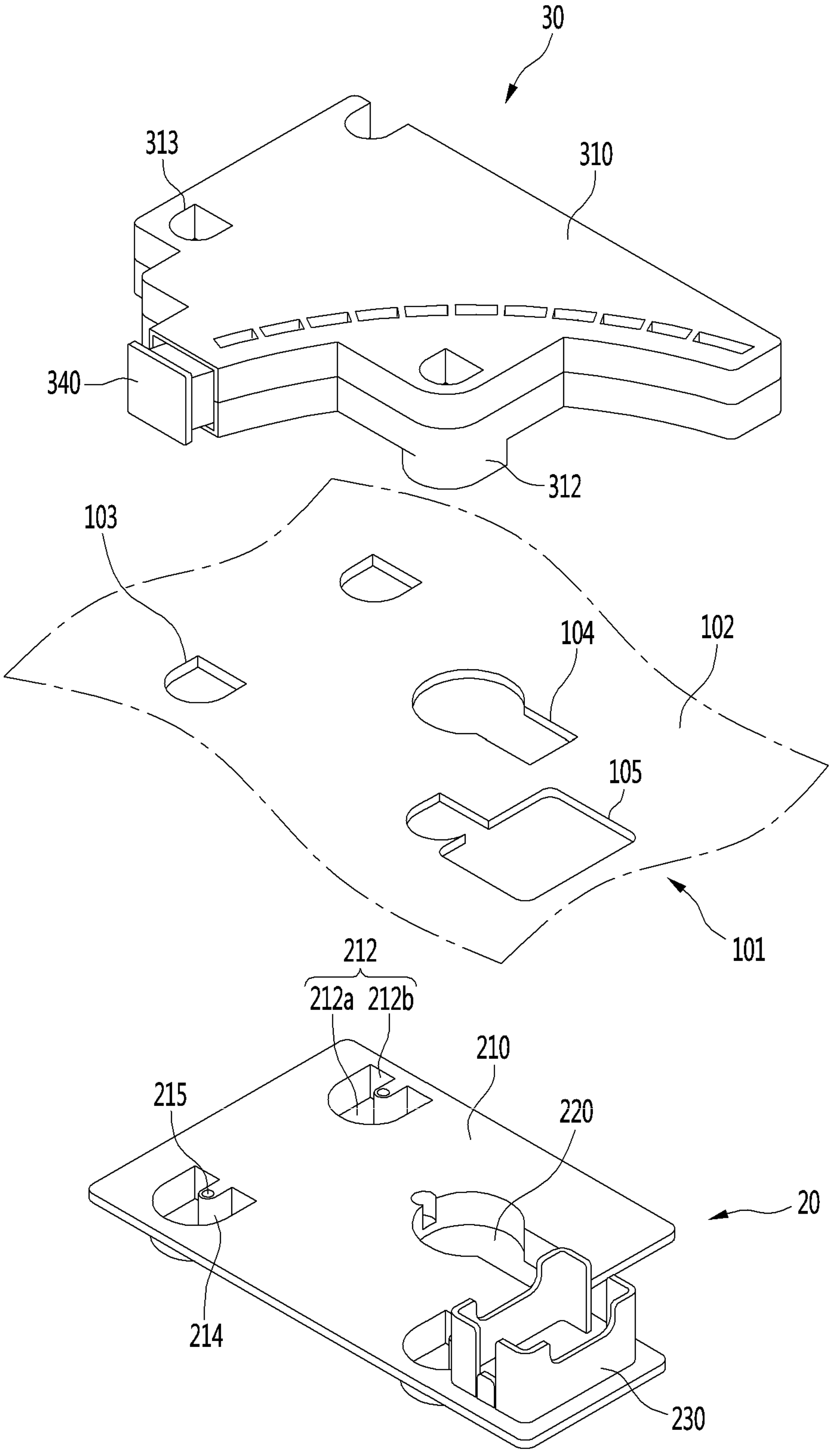
FIG. 3 is a diagram illustrating a door opening device according to an embodiment of the present invention and an installation bracket.
Figure 4:
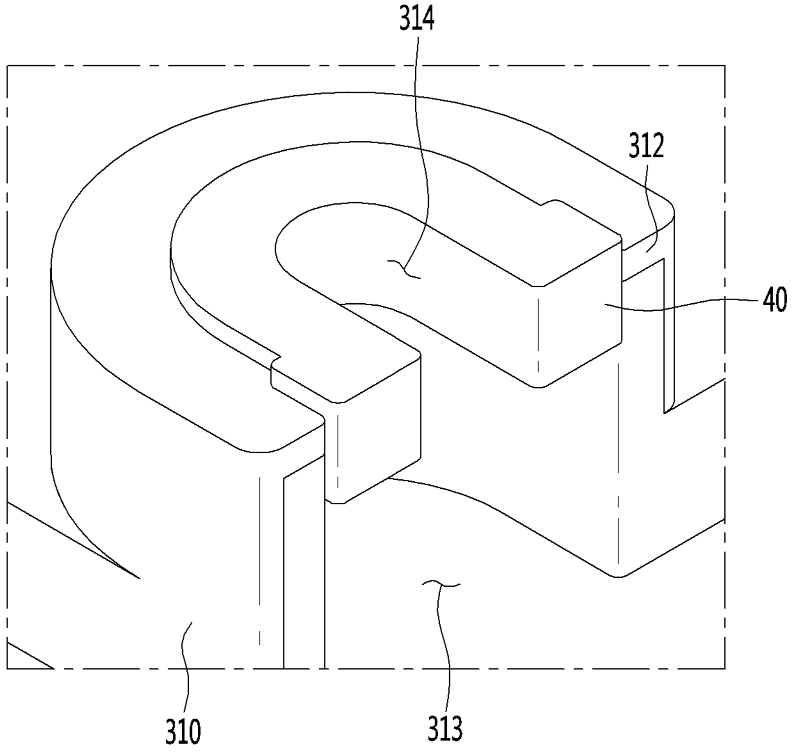
FIG. 4 is a perspective view illustrating an example where a buffer member is coupled to a door opening device according to an embodiment of the present invention.
Figure 5:
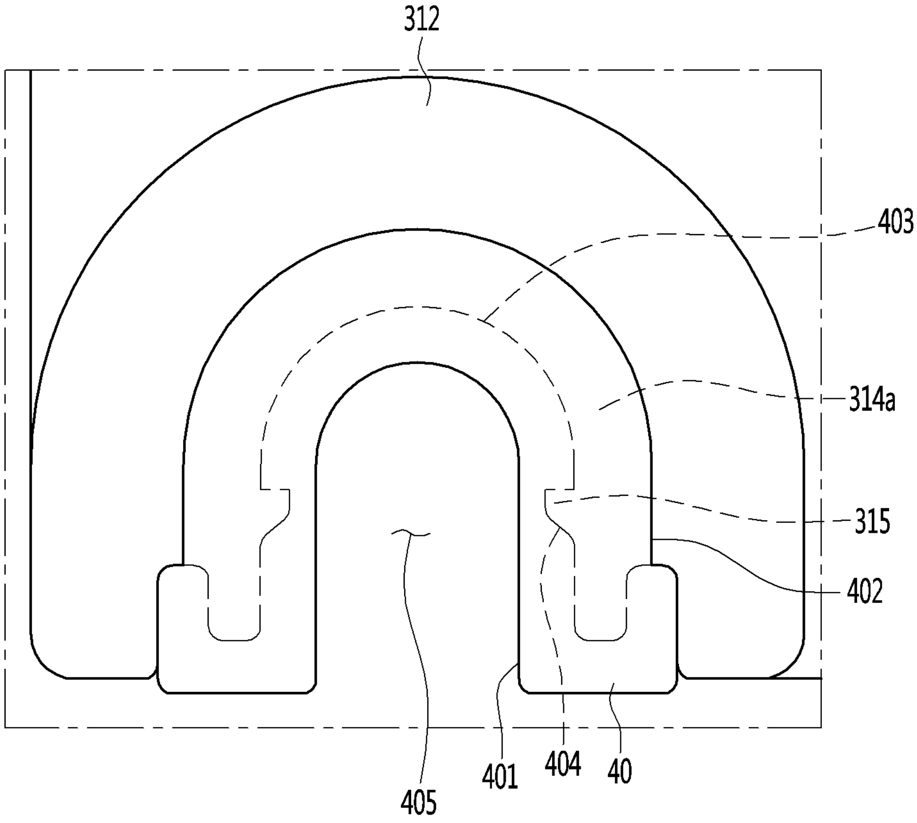
FIG. 5 is a plan view illustrating a structure of a coupling part of a housing and a buffer member.
Figure 6:
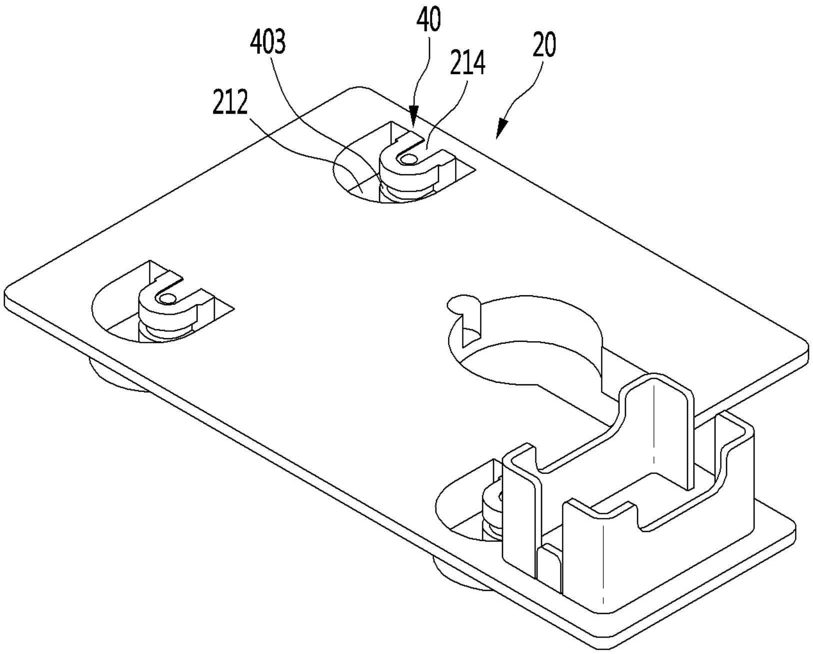
FIG. 6 is a diagram illustrating an example where a buffer member is coupled to an installation bracket of the present invention.

FIG. 3 is a diagram illustrating a door opening device according to an embodiment of the present invention and an installation bracket, FIG. 4 is a perspective view illustrating an example where a buffer member is coupled to a door opening device according to an embodiment of the present invention, FIG. 5 is a plan view illustrating a structure of a coupling part of a housing and a buffer member, and FIG. 6 is a diagram illustrating an example where a buffer member is coupled to an installation bracket of the present invention.

Referring to FIGS. 3 to 6, the door opening device 30 according to an embodiment of the present invention may be coupled to the installation bracket 20 fixed to the cabinet 10.

The installation bracket 20 may be disposed in an upper portion of the cabinet 10.

The installation bracket 20 may be fixed to the outer case 101 inside the outer case 101.

For example, the installation bracket 20 may be adhered to a bottom of an upper sidewall 102 of the outer case 101 by a coupling means such as an adhesive or a tape. That is, the installation bracket 20 may be disposed on a lower side of the upper sidewall 102 of the outer case 101.

In a state where the installation bracket 20 is fixed to the outer case 101, a foaming agent for forming a heat insulator may be filled into a space between the outer case 101 and the inner case.

The foaming agent may expand in a process of cooling the foaming agent, and thus, an adhesive force between the installation bracket 20 and the outer case 101 is enhanced.

According to the present embodiment, a structure for coupling the door opening device 30 to the outer case 101 may not directly be provided, and after the installation bracket 20 is coupled to the outer case 101, the door opening device 30 may be installed in the installation bracket 20.

Therefore, a position of the door opening device 30 may be fixed to an upper side of the cabinet 10 without changing a conventional mold structure for manufacturing the outer case 101.

Moreover, in order to fill the foaming agent into the outer case 101, a structure of a foaming zig griping the outer case 101 may be used as-is without being changed.

The installation bracket 20 may include a bracket body 210. A top of the bracket body 210 may contact the upper sidewall 102 under the upper sidewall 102 of the outer case 101.

The bracket body 210 may include one or more installation parts 212 for installing the door opening device 30.

The bracket body 210 may include a plurality of installation parts 212 in order for a position of the door opening device 30 to be solidly fixed.

The door opening device 30 may further include a housing 310 which accommodates the push member 340 and guides a movement of the push member 340. Also, the housing 310 may be installed in the installation bracket 20.

In the present embodiment, in a case where the push member 340 pushes the refrigerator door 12, a repulsion with which the refrigerator door 12 pressurizes the refrigerator door 12 may act on the push member 340.

In this case, as described above, the second end 344 of the push member 340 may be disposed closer to the sidewall 103 of the outer case 101 than the first end 343, and thus, when the repulsion acts on the push member 340, a force with which the outer circumference surface of the push member 340 pressurizes the housing 310 may increase.

That is, in a process of opening the refrigerator door 12, a force with which the outer circumference surface of the push member 340 pressurizes the housing 310 may increase. In this case, a large force may be applied to an installation part 212, disposed on the outer circumference surface of the push member 340, of the plurality of installation parts 212 of the installation bracket 20.

Therefore, a larger number of installation parts may be provided on the outer circumference surface than the inner circumference surface of the push member 340 so that when a repulsion acting on the push member 340 acts on the housing 310, the housing 310 is decoupled from the installation part 212 by the repulsion, or the damage of the installation part 212 is prevented.

In FIG. 3, an example where two installation parts 212 are provided near the outer circumference surface of the push member 340 and one installation part 212 is provided near the inner circumference surface of the push member 340 is illustrated.

Each of the installation parts 212 may be recessed downward from the bracket body 210 and provided. That is, each of the installation parts 212 may include a recessed part.

Each of the installation parts 212 may include a bottom surface 212*a* and a perimeter surface 212*b*.

A coupling projection 214 to which the buffer member 40 coupled to the door opening device 30 is coupled may be provided on the bottom surface 212*a* of each of the installation parts 212.

The coupling projection 214 may protrude upward from the bottom surface 212*a* and may be coupled to the perimeter surface 212*b*. For example, the coupling projection 214 may be provided as one body with the bottom surface 212*a* and the perimeter surface 212*b*.

In the present embodiment, since the coupling projection 214 is provided as one body with the bottom surface 212*a* and the perimeter surface 212*b*, the coupling projection 214 is prevented from being damaged by a repulsion applied to the push rod 341.

A fastening groove 215 to which a fastening member (see 50 of FIG. 7) is fastened may be provided in the coupling projection 214.

The installation bracket 20 may further include a motor accommodation part 220 into which the driving motor 320 generating the dynamic force for driving the push member 340 is accommodated.

For example, the bracket body 210 may be recessed downward, and thus, the motor accommodation part 220 may be provided.

In the present embodiment, since each of the installation parts 212 and the motor accommodation part 220 are recessed downward from the bracket body 210, a protrusion height of the door opening device 30 from the upper sidewall 102 of the outer case 10 is minimized in a state where the door opening device 30 is installed in the installation bracket 20.

The installation bracket 20 may further include a cable guide 230 which guides a cable. The cable guide 230 may guide the cable loaded into the refrigerator door 12.

The cable guide 230 may protrude upward from a top of the bracket bod 210.

The cable guide 230 may be disposed between the inner circumference surface of the push member 340 and the hinge shaft 106.

Since the installation bracket 20 is disposed under the upper sidewall 102 of the outer case 101, a plurality of openings may be provided in the upper sidewall 102 of the outer case 101 so that the door opening device 30 is installed in the installation bracket 20 over the upper sidewall 102 of the outer case 101.

The plurality of openings may include a plurality of first openings 103 through which the buffer member 40 coupled to the door opening device 30 passes, a second opening 104 through which the driving motor 320 passes, and a third opening 105 through which the cable guide 230 passes.

A space part 314 where the buffer member 40 is disposed may be provided in a coupling part 312 of the housing 310. A fixing part 314*a* protruding to the space part 314 may be provided in the coupling part 312.

Moreover, a recessed part which provides a space enabling the fastening member (see 50 of FIG. 7) to move may be provided in the housing 310. The recessed part 313 may communicate with the space part 314.

The buffer member 40 may be formed of a material for absorbing vibration. For example, the buffer member 40 may be formed of a rubber material.

The buffer member 40 may be provided in, for example, U-shape. That is, when seen from an upper side, the buffer member 40 may include one surface which is opened.

The buffer member 40 may include an inner circumference surface 401 and an outer circumference surface 402. A slot 403 into which the fixing part 314*a* is accommodated may be provided in the outer circumference surface of the buffer member 40.

Therefore, the buffer member 40 may be sliding-coupled to the coupling part 312 in order for the fixing part 314*a* to be fitted into the slot 403 of the buffer member 40.

A coupling hook 315 may be provided in the fixing part 314*a* so as to prevent the buffer member 40 from be separated from the coupling part 312 in a state where the fixing part 314*a* is fitted into the slot 403 of the buffer member 40, and a hook insertion part 404 into which the coupling hook 315 is inserted may be provided in the buffer member 40.

The hook insertion part 404 may be recessed in a direction from the slot 403 to the inner circumference surface 401 for example.

A pair of coupling hooks may be disposed to face each other so as to effectively prevent the buffer member 40 from being separated from the fixing part 314*a*.

The housing 310 may be installed in the installation bracket 20 with the buffer member 40 being coupled to the coupling part 312 of the housing 310.

Figure 7:
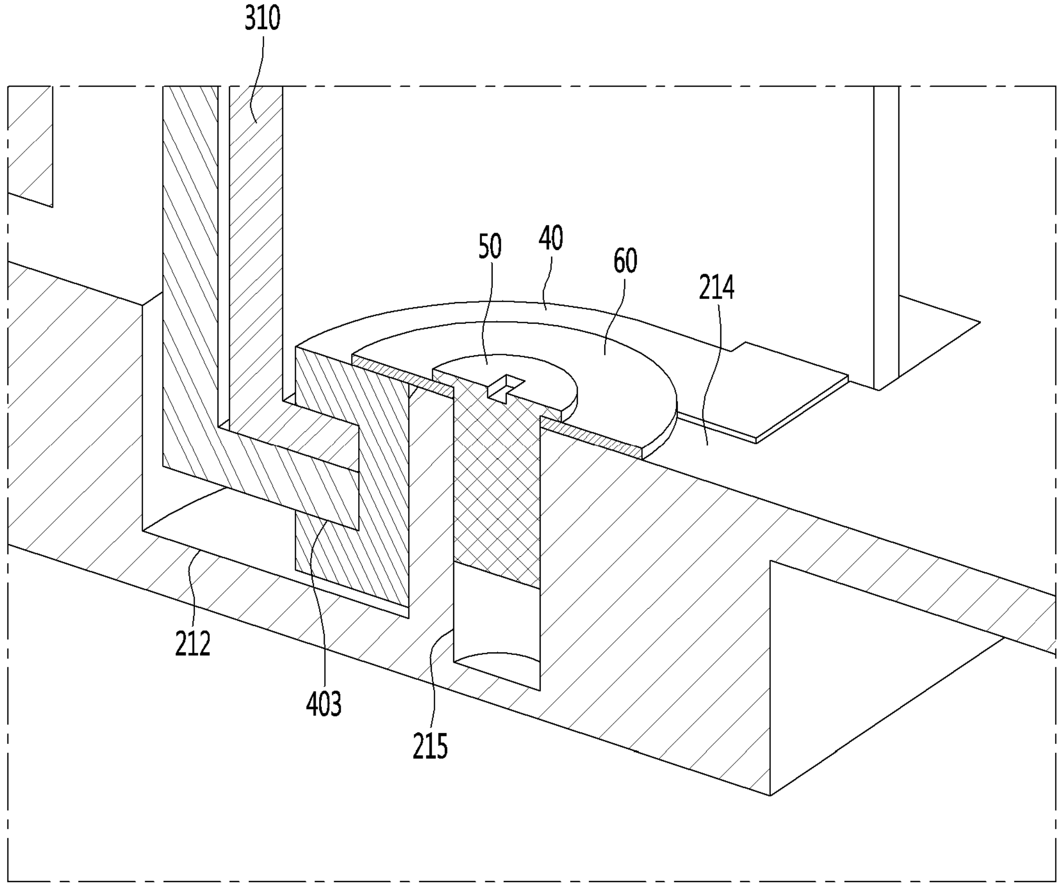
FIG. 7 is a cross-sectional view illustrating a state where a door opening device according to an embodiment of the present invention is installed in an installation bracket.

FIG. 7 is a cross-sectional view illustrating a state where a door opening device according to an embodiment of the present invention is installed in an installation bracket.

Referring to FIGS. 6 and 7, the installation part 212 of the installation bracket 20 and the coupling part 312 of the door opening device 30 may be aligned, and then, the coupling part 312 may be accommodated into the installation part 212.

The coupling part 312 of the door opening device 30 may pass through the first opening 103 of the upper sidewall 102 of the outer case 101 and may be accommodated into an internal space of the installation part 212.

Moreover, the buffer member 40 coupled to the coupling part 312 may be coupled to the coupling projection 214 in a process of accommodating the coupling part 312 of the door opening device 30 into the internal space of the installation part 212.

For example, since the buffer member 40 is provided in a U-shape, the inner circumference surface 401 of the buffer member 40 may be provided in a space 405 into which the coupling projection 214 is accommodated.

Therefore, the coupling projection 214 may be fitted into a space, where the buffer member 40 is provided, in a process of accommodating the coupling part 312 of the door opening device 30 into the internal space of the installation part 212.

A portion of the buffer member 40 may contact the bottom surface 212*a* of the installation part 214 with the coupling projection 214 being fitted into the buffer member 40, and another portion of the buffer member 40 may contact the perimeter surface 212*b* of the installation part 212. In this case, a portion of the outer circumference surface of the buffer member 40 may be spaced apart from the perimeter surface 212*b* of the installation part 212.

The fastening member 50 may be fastened to the coupling projection 214 with coupling projection 214 being fitted into the buffer member 40. The fastening member 50 may be fastened to the coupling projection 214 with the fastening member 50 being accommodated into the recessed part 314 which is provided in the housing 310.

At this time, the fastening member 50 may be fastened to the coupling projection 214 with a washer 60 being disposed between a head part of the fastening member 50 and the coupling projection 214.

The washer 60 may contact the buffer member 40 and may be spaced apart from the coupling projection 214. Alternatively, the washer 60 may contact a top of the coupling projection 214.

According to the present embodiment, since the fastening member 50 couples the housing 310 to the installation bracket 20 with the buffer member 40 being disposed, a degree to which vibration occurring in a process of operating the door opening device 30 is transferred to the installation bracket 20 is minimized. Also, a degree to which vibration occurring in the refrigerator is transferred to the door opening device 20 is minimized.

Hereinafter, an operation of the door opening device will be described.

Figure 8:
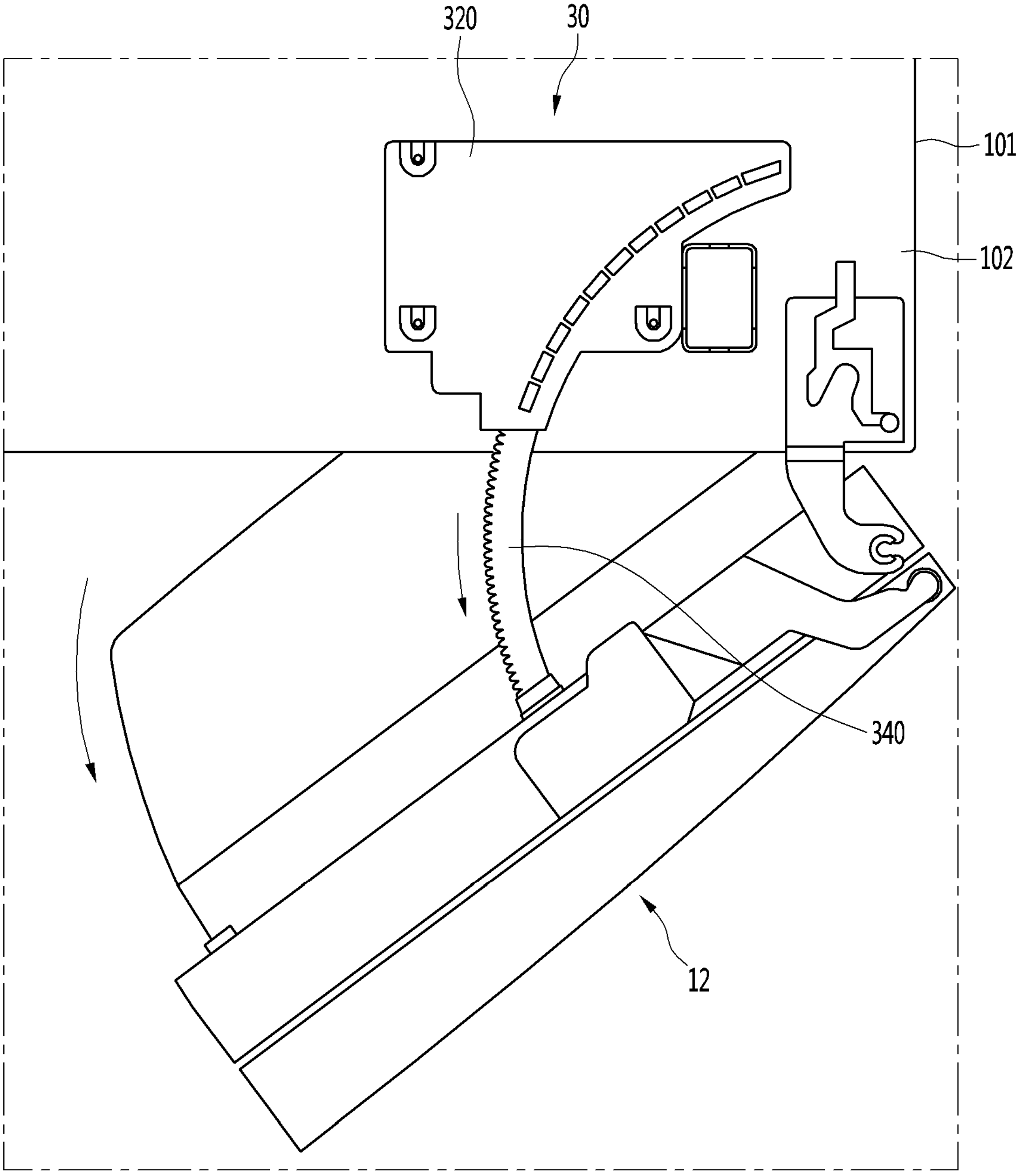
FIG. 8 is a diagram illustrating a state where a refrigerator door is opened by a door opening device according to an embodiment of the present invention.

FIG. 8 is a diagram illustrating a state where a refrigerator door is opened by a door opening device according to an embodiment of the present invention.

Referring to FIGS. 1 to 8, when the refrigerator 1 is turned on, a controller (not shown) may wait for an input of a door opening command.

When it is determined that the door opening command is input, the controller may control the driving motor 320 in order for the driving motor 320 to rotate in a first direction, for moving the push member 340 from an initial position to a door opening position.

When the driving motor 320 rotates in the first direction, the power transfer unit 322 may a first direction rotation force of the driving motor 320 to the push member 340, and thus, the push member 340 may push the refrigerator door 12 to rotate the refrigerator door 12.

In a process of rotating the driving motor 320 in the first direction, the controller may determine whether the push member 340 reaches the door opening position.

By using a sensor (not shown), the controller may determine whether the push member 340 reaches the door opening position. Alternatively, when the accumulated number of rotations of the driving motor 320 reaches a reference rotation number, the controller may determine that the push member 340 reaches the door opening position.

When it is determined that the push member 340 moves to the door opening position, the controller may stop the rotation of the driving motor 320.

In a state where the refrigerator door 12 has rotated at a certain angle, a user may passively increase an opening angle of the refrigerator door 12.

In the present embodiment, as described above, since the push member having a curved shape is disposed on an upper side of the cabinet, the opening angle of the refrigerator door may increase based on the push member.

The controller may determine whether a certain time elapses from a time when the push member 340 moves to the door opening position and the driving motor 320 stops.

When it is determined that the certain time elapses from the time when the driving motor 320 stops, the controller may allow the driving motor 320 to rotate in a second direction, for returning the push member 340 to the initial position.

Moreover, the controller may determine whether the push member 340 returns to the initial position, and when it is determined that the push member 340 returns to the initial position, the controller may stop the driving motor 320.

According to a proposed embodiment, since the door opening device is installed in the cabinet, a length of the push member may increase, and thus, an opening angle of the refrigerator door may increase.

Moreover, according to the present embodiment, a structure for coupling the door opening device to the outer case may not directly be provided, and after the installation bracket is coupled to the outer case, the door opening device may be installed in the installation bracket. Therefore, a position of the door opening device may be fixed to an upper side of the cabinet without changing a conventional mold structure for manufacturing the outer case.

Moreover, according to the present embodiment, since the coupling projection is provided as one body with the bottom surface and the perimeter surface of the installation part, the coupling projection is prevented from being damaged by a repulsion applied to the push rod.

It will be apparent to those skilled in the art that various modifications and variations can be made in the present invention without departing from the spirit or scope of the disclosures. Thus, it is intended that the present invention covers the modifications and variations of this disclosure provided they come within the scope of the appended claims and their equivalents.

What is claimed is:

1. A refrigerator comprising:

a cabinet that defines a storage compartment, the cabinet comprising an outer case that defines an external appearance of the refrigerator;

a refrigerator door coupled to the cabinet and configured to open and close the storage compartment;

an installation bracket coupled to the cabinet; and a door opening device that is located at an outside of the cabinet and that includes (i) a push member configured to open the refrigerator door and (ii) a driving motor configured to operate the push member, wherein the installation bracket comprises an installation part that has a recessed shape, and wherein the door opening device comprises a coupling part that is configured to couple to the installation part.

2. The refrigerator of claim 1, further comprising a buffer member located at the coupling part between the door opening device and the installation bracket.

3. The refrigerator of claim 2, wherein the door opening device comprises a housing to receive the push member, and the coupling part is protruded downward from the housing.

4. The refrigerator of claim 2, wherein the push member is located outside the cabinet and the buffer member is configured to pass through the cabinet to be coupled to the installation part.

5. The refrigerator of claim 2, wherein the installation part comprises a bottom surface, a perimeter surface, and a coupling projection that protrudes from the bottom surface and that is configured to couple to the buffer member, and wherein a portion of the coupling projection is connected to the perimeter surface.

6. The refrigerator of claim 1, wherein the push member comprises a first end configured to contact the refrigerator door based on opening the refrigerator door, and a second end disposed at an opposite side of the first end, wherein the push member extends from the first end to the second end as a curved shape.

7. The refrigerator of claim 6, wherein a length from the first end to the second end is greater than a thickness of the refrigerator door.

8. The refrigerator of claim 1, wherein the installation bracket further comprises a cable guide configured to guide a cable connected to the refrigerator door.

9. The refrigerator of claim 8, wherein the refrigerator door comprises a hinge shaft configured to enable rotation of the refrigerator door relative to the cabinet, wherein the push member has an inner circumference surface facing the hinge shaft, and an outer circumference surface opposite to the inner circumference surface, wherein the cable guide is located between the inner circumference surface of the push member and the hinge shaft.

10. A refrigerator comprising:

a cabinet that defines a storage compartment, the cabinet comprising an outer case that defines an external appearance of the refrigerator;

a refrigerator door coupled to the cabinet and configured to open and close the storage compartment;

an installation bracket coupled to the cabinet and provided at an inside of the outer case; and a door opening device that is located outside of the cabinet and that includes a push member configured to open the refrigerator door and a coupling part, wherein the cabinet comprises an opening such that the coupling part is coupled to the installation bracket through the opening.

11. The refrigerator of claim 10, wherein the coupling part passes through the opening and then coupled to the installation bracket.

12. The refrigerator of claim 11, wherein the installation bracket comprises an installation part that has a recessed shape to receive the coupling part and wherein the installation part comprises a coupling projection to be coupled to the coupling part.

13. The refrigerator of claim 10, wherein the door opening device comprises a driving motor configured to operate the push member, and wherein the cabinet comprises an additional opening, and the driving motor passes through the additional opening.

14. The refrigerator of claim 13, wherein the installation bracket comprises a motor accommodation part, and the driving motor is accommodated in the motor accommodation part.

15. The refrigerator of claim 10, wherein the installation bracket comprises a cable guide configured to guide a cable connected to the refrigerator door.

16. The refrigerator of claim 15, wherein the cabinet comprises an additional opening through which the cable guide passes.

17. A refrigerator comprising:

a cabinet that defines a storage compartment, the cabinet comprising an outer case that defines an external appearance of the refrigerator;

a refrigerator door coupled to the cabinet by a hinge shaft and configured to open and close the storage compartment;

a door opening device mounted on the cabinet at an outside of the outer case and that includes a push member configured to open the refrigerator door; and a cable guide protruded upward from cabinet to guide a cable connected to the refrigerator door, wherein the cable guide is positioned between the push member and the hinge shaft.

18. The refrigerator of claim 17, wherein the cable guide passes through the outer case.

19. The refrigerator of claim 17, wherein the door opening device comprises a driving motor for driving the push member, and wherein the cabinet comprises an opening through which the driving motor passes.

20. The refrigerator of claim 17, wherein the door opening device comprises a driving motor configured to operate the push member, and wherein the push member is located between the driving motor and the cable guide.

* * * * *